(12) United States Patent
Takada et al.

(10) Patent No.: US 10,357,944 B2
(45) Date of Patent: Jul. 23, 2019

(54) ALUMINUM ALLOY SHEET, BONDED OBJECT, AND MEMBER FOR MOTOR VEHICLE

(71) Applicant: KOBE STEEL, LTD., Kobe-shi (JP)

(72) Inventors: Satoru Takada, Kobe (JP); Akihiko Tatsumi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 838 days.

(21) Appl. No.: 14/892,123

(22) PCT Filed: May 21, 2014

(86) PCT No.: PCT/JP2014/063512
§ 371 (c)(1),
(2) Date: Nov. 18, 2015

(87) PCT Pub. No.: WO2014/189090
PCT Pub. Date: Nov. 27, 2014

(65) Prior Publication Data
US 2016/0082702 A1    Mar. 24, 2016

(30) Foreign Application Priority Data

May 23, 2013 (JP) ................................. 2013-109114

(51) Int. Cl.
| | | |
|---|---|---|
| C25D 11/04 | (2006.01) | |
| C25D 11/24 | (2006.01) | |
| B32B 15/08 | (2006.01) | |
| B32B 15/20 | (2006.01) | |
| B32B 27/18 | (2006.01) | |
| B32B 27/32 | (2006.01) | |
| B32B 27/34 | (2006.01) | |
| B32B 7/12 | (2006.01) | |
| B32B 15/04 | (2006.01) | |
| C09D 5/00 | (2006.01) | |
| B32B 27/30 | (2006.01) | |
| B32B 27/36 | (2006.01) | |
| B32B 27/40 | (2006.01) | |

(52) U.S. Cl.
CPC ............. *B32B 15/08* (2013.01); *B32B 7/12* (2013.01); *B32B 15/043* (2013.01); *B32B 15/20* (2013.01); *B32B 27/18* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 27/40* (2013.01); *C09D 5/002* (2013.01); *C25D 11/04* (2013.01); *C25D 11/24* (2013.01); *B32B 2255/06* (2013.01); *B32B 2255/20* (2013.01); *B32B 2255/24* (2013.01); *B32B 2255/26* (2013.01); *B32B 2255/28* (2013.01); *B32B 2262/0253* (2013.01); *B32B 2262/0269* (2013.01); *B32B 2262/10* (2013.01); *B32B 2262/101* (2013.01); *B32B 2262/106* (2013.01); *B32B 2307/50* (2013.01); *B32B 2307/56* (2013.01); *B32B 2605/00* (2013.01)

(58) Field of Classification Search
None
See application file for complete search history.

(56) References Cited

U.S. PATENT DOCUMENTS

| | | | | |
|---|---|---|---|---|
| 2008/0283228 | A1* | 11/2008 | Ohwaki | ................. C09D 5/086 165/151 |
| 2011/0123390 | A1* | 5/2011 | Kim | ......................... C22C 1/03 420/532 |
| 2017/0334171 | A1* | 11/2017 | Takada | ..................... B32B 9/00 |

FOREIGN PATENT DOCUMENTS

| | | |
|---|---|---|
| CN | 103057198 A | 4/2013 |
| JP | 06-256881 A | 9/1994 |
| JP | 2000-239644 A | 9/2000 |
| JP | 2003-147550 A | 5/2003 |
| JP | 2003-342790 A | 12/2003 |
| JP | 2004-018906 A | 1/2004 |
| JP | 2005-349691 A | 12/2005 |
| JP | 2006-200007 A | 8/2006 |
| JP | 2007-217750 A | 8/2007 |
| JP | 2008-266663 A | 11/2008 |

OTHER PUBLICATIONS

International Search Report and Written Opinion dated Aug. 26, 2014 for PCT/JP2014/063512 filed on May 21, 2014.

* cited by examiner

*Primary Examiner* — Sheeba Ahmed
(74) *Attorney, Agent, or Firm* — Oblon, McClelland, Maier & Neustadt, L.L.P.

(57) ABSTRACT

An aluminum alloy substrate bears a first layer on at least one side thereof, and a second layer on at least part of the first layer. The first layer includes an oxide film containing Mg in a content of from 0.1 atomic percent to less than 30 atomic percent. The second layer contains siloxane bonds. The second layer is disposed in a mass of coating of from 0.1 mg/m$^2$ to less than 30 mg/m$^2$. Assume that parallel polarized light is applied to the side bearing the first layer and the second layer at an incident angle of 75°, and resulting data are analyzed by Fourier-transform infrared spectroscopy to give a spectrum. In the spectrum, a peak occurring adjacent to 1057 cm$^{-1}$ has an area of 0.01 or more with respect to a base line drawn from 1026 cm$^{-1}$ to 1084 cm$^{-1}$.

11 Claims, 7 Drawing Sheets

A

B

A

B

A

B

ALUMINUM ALLOY SHEET, BONDED OBJECT, AND MEMBER FOR MOTOR VEHICLE

TECHNICAL FIELD

The present invention relates to aluminum alloy sheets, bonded articles, and automotive components. More specifically, the present invention relates to an aluminum alloy sheet bearing an oxide film on at least one side; and a bonded article and an automotive component each prepared using the aluminum alloy sheet.

BACKGROUND ART

Various aluminum alloy sheets are used in components (members or parts) of transportation equipment such as automobiles, ships, and aircraft as being appropriately selected according to their properties. Independently, weight reduction of the components has been demanded so as to provide better fuel efficiency by in consideration of global environmental issues such as $CO_2$ emission control. This increases the use of aluminum alloy sheets, which have a specific gravity of about one-third that of iron and have excellent energy absorption.

For example, automotive components employ Mg-containing aluminum alloy sheets such as Japanese Industrial Standard (JIS) 5xxx-series Al—Mg alloy sheets and JIS 6xxx-series Al—Mg—Si alloy sheets. These aluminum alloy sheets are bonded (joined) by welding or adhesion with an adhesive, or both in combination. The bonding by welding bonds the aluminum alloy sheet at points or in a line, whereas the bonding by adhesion with an adhesive bonds the aluminum alloy sheet in the entire surface, thereby offers a high bond strength, and is advantageous typically in crashworthiness. The adhesion with an adhesive has been recently increasingly employed in automotive components.

Disadvantageously, however, such aluminum alloy automotive components bonded with an adhesive, when any of moisture, oxygen, and chloride ions permeates the bonded portion, have a lower bond strength because the interface between the adhesive layer and the aluminum alloy sheet gradually deteriorates to cause interfacial peeling. As possible solutions to this, there have been investigated techniques to prevent the bond strength reduction and to allow an aluminum alloy automotive component including an adhesive layer to have better bond durability (see, for example, Patent Literature 1 to 3).

Typically, Patent Literature 1 proposes a technique in which a Mg-enriched layer is removed from an aluminum alloy sheet surface, and Cu is enriched in the aluminum alloy sheet surface both by one acid wash treatment. Patent Literature 2 proposes a technique in which an aluminum alloy sheet having an OH absorption coefficient controlled within a specific range in relation to the amount of Mg enriched (segregated) in the surface of the sheet. Patent literature 3 proposes a technique in which a solution heat treatment and a hot-water treatment are successively performed so as to control a Mg content, Si content, and a OH content in an oxide film surface layer of an aluminum material within specific ranges.

CITATION LIST

Patent Literature

Patent Literature 1: Japanese Unexamined Patent Application Publication (JP-A) No. Hei06(1994)-256881
Patent Literature 2: JP-A No. 2006-200007
Patent Literature 3: JP-A No. 2007-217750

SUMMARY OF INVENTION

Technical Problem

Unfortunately, however, the aluminum alloy sheets according to the conventional techniques, upon exposure to hot and humid environments, undergo proceeding interfacial deterioration and interfacial peeling and thereby have a lower bond strength and/or suffer from accelerated Al corrosion.

Accordingly, the present invention has a primary object to provide an aluminum alloy sheet, a bonded article, and an automotive component, each of which resists bond strength reduction and has excellent bond durability even upon exposure to hot and humid environments.

Solution to Problem

The present inventors made intensive experiments and investigations to achieve the object and had findings as follows. In the technique employing the acid wash, the base metal of the aluminum alloy sheet is bonded to the adhesive layer through hydrogen bonds. When the aluminum alloy sheet is exposed to deterioration-causative hot and humid environments, the interface between the base metal and the adhesive layer is hydrated and has a reduced bonding strength (reduced hydrogen bonding). Independently, Cu enrichment (segregation) in the aluminum alloy sheet surface promotes the corrosion of aluminum alloy sheet in hot and humid environments, because of potential difference between Cu and Al.

In an aluminum alloy sheet according to a technique employing anodic oxidation, an aluminum alloy sheet base metal and an adhesive layer are also bonded to each other through hydrogen bonds. The aluminum alloy sheet, upon exposure to hot and humid environments from which any of moisture, oxygen, and chloride ions permeates, undergoes hydration of the interface and thereby has a reduced bonding strength. The technique employing anodic oxidation requires complicated equipment with high facility cast, also requires a long time to form the oxide film, and has a reduced production efficiency. In the aluminum alloy sheet according to the technique employing the hot-water treatment, the aluminum alloy sheet base metal and the adhesive layer are also bonded to each other through hydrogen bonds. The aluminum alloy sheet, upon exposure to hot and humid environments, suffers from hydration and resulting deterioration of the interface, undergoes interfacial peeling, and has a reduced bond strength.

Based on these findings, the present inventors made investigations on bonding between the substrate surface and the adhesive layer and have found that an aluminum alloy sheet, when provided with an oxide film containing a specific amount of magnesium on the substrate surface, and further provided with a layer containing a siloxane bond on the oxide film, can be protected from bond strength reduction upon exposure to hot and humid environments. The present invention has been made based on these findings.

Specific ally, the present invention provides an aluminum alloy sheet including an aluminum alloy substrate, a first layer, and a second layer. The first layer is disposed on at least one side of the aluminum alloy substrate and includes an oxide film containing Mg in a content of from 0.1 atomic percent to less than 30 atomic percent. The second layer is disposed on at least part of the first layer and contains a siloxane bond. The second layer is present in a mass of coating of from 0.1 mg/m$^2$ to less than 30 mg/m$^2$. Assume that parallel polarized light is applied to the side bearing the first layer and the second layer at an incident angle of 75°, and resulting data are analyzed by Fourier-transform infrared spectroscopy to give a spectrum. In the spectrum, a peak occurring adjacent to 1057 cm$^{-1}$ has an area of 0.01 or more with respect to a base line drawn from 1026 cm$^{-1}$ to 1084 cm$^{-1}$.

The Mg content in the first layer is a value as measured by glow discharge-optical emission spectroscopy (GD-OES). The mass of coating of the second layer is a mass of coating after drying. It is difficult to determine the amount of M-O—Si bonds between the first layer and the second layer unless a spectral peak area in an FT-IR spectrum is specified as an index. Accordingly, the amount of M-O—Si bonds between the first layer and the second layer is specified (determined) in the present invention using the spectral peak assigned to M-O—Si bonds.

The aluminum alloy substrate may have an amount of Cu exposed to the surface of less than 0.5 atomic percent. As used herein the term "amount of Cu" refers to a value measured by glow discharge-optical emission spectroscopy (GD-OES).

The aluminum alloy substrate may include an aluminum alloy selected typically from Al—Mg alloys, Al—Cu—Mg alloys, Al—Mg—Si alloys, and Al—Zn—Mg alloys.

The aluminum alloy sheet according to the present invention may further include an adhesive layer on the second layer, where the adhesive layer includes an adhesive.

The present invention also provides a bonded article that employs (includes) the aluminum alloy sheet.

In an embodiment, the bonded article according to the present invention may structurally further include another ply of the aluminum alloy sheet. The two aluminum alloy sheets are bonded to each other through an adhesive so that the side bearing the first layer and the second layer of one of the two aluminum alloy sheets faces the side bearing the first layer and the second layer of the other.

In another embodiment, the bonded article may structurally further include a component selected from another aluminum alloy sheet devoid of the first layer and the second layer; and a resin molded article. The component is bonded through an adhesive to the side bearing the first layer and the second layer of the aluminum alloy sheet.

In yet another embodiment, the bonded article may structurally include the aluminum alloy sheet including the adhesive layer, and the aluminum alloy sheet devoid of the adhesive layer. The two aluminum alloy sheets are bonded to each other through the adhesive layer so that the side bearing the adhesive layer faces the side bearing the first layer and the second layer.

In still another embodiment, the bonded article may structurally include the aluminum alloy sheet including the adhesive layer, and a component selected from another aluminum alloy sheet devoid of the first layer and the second layer, and a resin molded article. The component is bonded to the side bearing the adhesive layer of the aluminum alloy sheet.

The resin molded article may include a fiber-reinforced plastic molded article.

In addition, the present invention provides an automotive component produced using the bonded article.

Advantageous Effects of Invention

The present invention can actually provide an aluminum alloy sheet that resists bond strength reduction and has excellent bond durability even upon exposure to hot and humid environments.

DESCRIPTION OF EMBODIMENTS

Embodiments of the present invention will be illustrated in detail below. It should be noted, however, that the embodiments are never intended to limit the scope of the present invention.

First Embodiment

Figure 1:
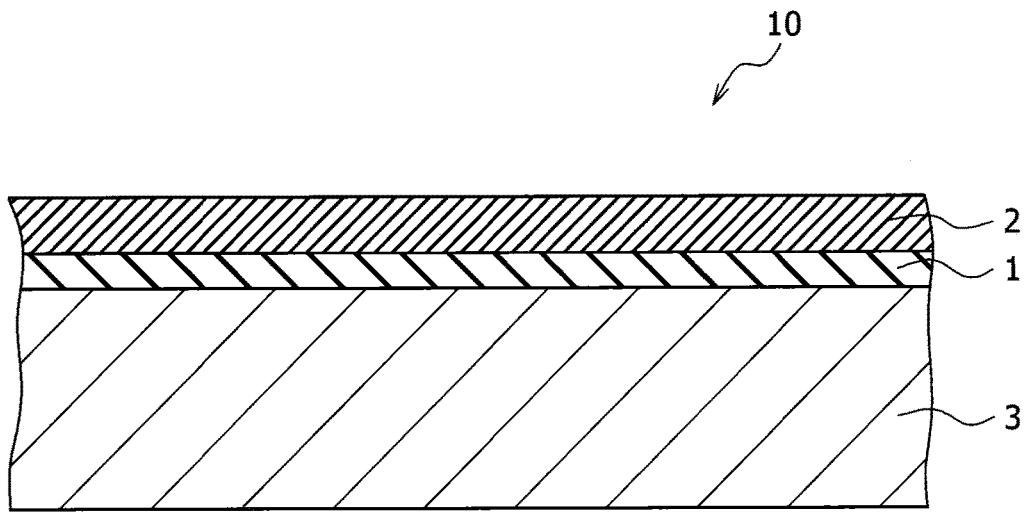
FIG. 1 is a cross-sectional view schematically illustrating a typical configuration of an aluminum alloy sheet according to a first embodiment of the present invention.

Initially an aluminum alloy sheet according to the first embodiment of the present invention will be illustrated. FIG. 1 is a cross-sectional view schematically illustrating a configuration of the aluminum alloy sheet according to the embodiment. As illustrated in FIG. 1, the aluminum alloy sheet 10 according to the embodiment includes an aluminum alloy substrate 3, a first layer 1, and a second layer 2. The first layer 1 is disposed on at least one side of the aluminum alloy substrate 3 and includes an oxide film. The second layer 2 is disposed on at least part of the first layer 1 and contains a siloxane bond.

Substrate 3

The substrate 3 includes an aluminum alloy. The aluminum alloy for use herein to constitute the substrate 3 is not limited in type and can be selected as appropriate according to the use of the target component (member) into which the aluminum alloy sheet is processed. The aluminum alloy may be selected from non-heat-treated or heat-treated aluminum alloys as prescribed in, or as approximal to, Japanese Industrial Standards (JIS). The non-heat-treated aluminum alloys are exemplified by pure aluminum (1xxx-series), Al—Mn alloys (3xxx-series), Al—Si alloys (4xxx-series), and Al—Mg alloys (5xxx-series). The heat-treated aluminum alloys are exemplified by Al—Cu—Mg alloys (2xxx-series), Al—Mg—Si alloys (6xxx-series), and Al—Zn—Mg alloys (7xxx-series).

For example, assume that the aluminum alloy sheet 10 according to the embodiment is used in an automotive component. In this case, the substrate 3 preferably has a 0.2% yield strength of 100 MPa or more from the viewpoint of strength. Aluminum alloys capable of forming a substrate that meets the condition are exemplified by alloys containing magnesium in a relatively high content, such as 2xxx-series, 5xxx-series, 6xxx-series, and 7xxx-series alloys. Each of these alloys may be subjected to temper refining as needed. Among various aluminum alloys, 6xxx-series aluminum alloys are preferably employed because these alloys have excellent age hardenability, require relatively smaller amounts of alloy elements, and offer excellent scrap recyclability and formability.

In hot and humid environments, copper (Cu) present in the surface of the aluminum alloy substrate 3 causes and promotes the alkalization of the surface of the substrate 3, impairs the adhesive, and also causes and promotes the corrosion of the substrate 3, where the corrosion is caused by potential difference between Cu and aluminum (Al). To prevent this, the amount of Cu exposed to the surface of the substrate 3 is preferably controlled to less than 0.5 atomic percent. This allows the aluminum alloy sheet to resist deterioration of the adhesive and/or the corrosion of the substrate 3 even upon used in hot and humid environments.

The amount of Cu exposed to the surface of the substrate 3 may be measured by glow discharge-optical emission spectroscopy (GD-OES). In the embodiment, the amount of Cu is determined in the following manner. Amounts of elements excluding oxygen (O), nitrogen (N), and carbon (C) are measured in the thickness direction of the substrate 3 by glow discharge-optical emission spectroscopy (GD-OES), where the elements to be measured are exemplified by metal elements such as aluminum (Al), magnesium (Mg), copper (Cu), iron (Fe), and titanium (Ti), and other elements such as silicon (Si). Based on the results, the amount of copper (Cu) in an outermost layer is calculated in percentage, and this is defined as the amount of Cu.

First Layer 1

The first layer 1 includes an oxide film containing Mg in a content of from 0.1 atomic percent to less than 30 atomic percent. The first layer 1 is provided so as to have better bond durability upon exposure to hot and humid environments. The aluminum alloy constituting the substrate of the aluminum alloy sheet generally includes Mg as an alloy element. When an oxide film as a complex oxide of aluminum and magnesium is formed on the surface of the substrate 3 of this type, magnesium is present as enriched (segregated) in the surface.

When an adhesive layer is disposed on the oxide film, Mg in the surface acts as a weak boundary layer at the adhesion interface and causes reduction in initial adhesiveness. In addition, assume that this aluminum alloy sheet is placed in hot and humid environments from which any of moisture, oxygen, and chloride ions permeates the aluminum alloy sheet. In this case, Mg causes the hydration of the interface with the adhesive layer and/or the dissolution of the substrate 3 and causes the aluminum alloy sheet to have inferior bond durability. Specifically, Mg, if contained in the oxide film in a content of 30 atomic percent or more, may cause the aluminum alloy sheet to have inferior bond durability.

To prevent this, the Mg content in the first layer 1 including the oxide film is controlled to less than 30 atomic percent in the aluminum alloy sheet 10 according to the embodiment. This allows the aluminum alloy sheet to have better bond durability. The first layer 1 may have a Mg content of preferably less than 20 atomic percent, and more preferably less than 10 atomic percent for still better bond durability. In contrast, the first layer 1 may have a Mg content of 0.1 atomic percent or more in terms of lower limit. This is preferred from the viewpoint of economic efficiency. The Mg content in the first layer 1 herein may be measured by glow discharge-optical emission spectroscopy (GD-OES) as with the amount of Cu.

The Mg content in the first layer 1 may be adjusted by any method which is exemplified by, but not limited to, a method of performing a surface treatment with an acid and/or an alkaline solution. The acid is exemplified by nitric acid, sulfuric acid, hydrofluoric acid, and a mixed acid. The alkaline solution contains an alkali such as potassium hydroxide, sodium hydroxide, a silicates, or a carbonate. According to this method, the Mg content in the first layer 1 (oxide film) is adjusted by dissolving Mg in the acid and/or alkaline solution. Thus, the Mg content in the first layer 1 can be controlled within the range by adjusting the treatment time; temperature; and concentration and pH of the surface treatment liquid.

Elements in the first layer 1 excluding Mg are oxygen, aluminum, and inevitable impurities. The first layer 1 preferably contains oxygen and aluminum each in a content of 15 to 80 atomic percent. The inevitable impurities are exemplified by C, N, Si, Ca, Fe, Cu, Mn, Ti, Zn, and Ni. The first layer 1 may contain these impurities in contents of less than 10 atomic percent for C, less than 15 atomic percent for N, and less than 7 atomic percent for other impurities.

The first layer 1 (oxide film) preferably has a thickness of 1 to 30 nm. If the first layer 1 has a thickness less than 1 nm, the aluminum alloy sheet may less adsorb an ester component, where the ester component is contained in a rust preventive oil used in the preparation of the substrate 3 and/or in a press forming oil used in the production of the bonded article or automotive component from aluminum alloy sheet 10. The aluminum alloy sheet 10 can thereby surely have degreasability, chemical conversion treatability, and bond durability even without the first layer 1 (oxide film). However, control of the thickness of the first layer 1 to less than 1 nm may require excessive acid wash. This may often cause the aluminum alloy sheet to be produced with inferior productivity and to have inferior practical utility. In addition, such excessive acid wash may cause Cu in the substrate 3 to segregate in the surface and thereby cause deterioration in bond durability.

In contrast, the first layer 1, if having a thickness greater than 30 nm, is present in an excessively large mass of coating and may often cause surface unevenness. Unevenness in the surface of the first layer 1, if occurring, may readily cause an uneven chemical conversion coating in a chemical conversion treatment performed before a coating process typically in an automobile use. This may cause reduction in chemical conversion treatability. The first layer 1 (oxide film) has a thickness of more preferably from 3 nm to less than 20 nm from the viewpoints typically of chemical conversion treatability and productivity.

Second Layer 2

The second layer 2 contains a siloxane bond and is present in a mass of coating of from 0.1 mg/m$^2$ to less than 30 mg/m$^2$. This can control the amount of M-O—Si bonds between the first layer 1 and the second layer 2 within a specific range and can provide excellent bond durability. In contrast, the second layer 2, if present in a mass of coating less than 0.1 mg/m$^2$, may fail to allow the aluminum alloy sheet to have sufficient bond durability. This is because Cu exposed to the surface of the substrate 3 affects and/or M-O—Si bonds between the first layer 1 and the second layer 2 are present in an insufficient amount.

The second layer 2, if present in a mass of coating of 30 mg/m$^2$ or more, may undergo cohesive failure by itself and may thereby cause the aluminum alloy sheet to have inferior bond durability. The siloxane-bond-containing second layer 2 is preferably disposed as being thin and uniform on the first layer 1. However, the second layer 2 may be disposed in islands on the first layer 1.

Amount of M-O—Si Bonds

Upon the formation of the siloxane-bond-containing second layer 2 on the first layer 1 including the oxide film, M-O—Si bonds are formed between them. Herein 'M' represents an element contained in the aluminum alloy substrate 3. Specifically, the element is exemplified by Al and Mg contained in the first layer 1.

The M-O—Si bonds act as primary bonds between the first layer 1 including the oxide film and the siloxane-bond-containing second layer 2. The amount of the bonds is affected by the structure of the oxide film constituting the first layer 1. The amount of M-O—Si bonds may be determined from the area of a specific peak in an FT-IR spectrum. Specifically, assume that parallel polarized light is applied at an incident angle of 75° to the side bearing the first layer 1 and the second layer 2, and resulting data are analyzing data by Fourier-transform infrared spectroscopy (FT-IR) to give a spectrum. In the spectrum, the area of the peak assigned to M-O—Si bonds and occurring adjacent to 1057 cm$^{-1}$ is determined with respect to a base line drawn from 1026 cm$^{-1}$ to 1084 cm$^{-1}$. The position of the peak assigned to M-O—Si bonds may shift within the range of about 1045 to 1065 cm$^{-1}$ depending on the type and proportion of the element M.

The aluminum alloy sheet 10 according to the embodiment has an area of a peak occurring adjacent to 1057 cm$^{-1}$ of 0.01 or more, where the area is calculated by the method as above. The aluminum alloy sheet, if having an area of the peak assigned to M-O—Si bonds of less than 0.01, may more frequently undergo interfacial peeling at the interface between the first layer 1 and the second layer 2 and may fail to have desired bond durability. The aluminum alloy sheet may have an area of the peak assigned to M-O—Si bonds of preferably 0.017 or more, and more preferably 0.025 or more for still better bond durability.

The aluminum alloy sheet 10 according to the embodiment may be subjected to an additional treatment so as to increase M-O—Si bonds between the first layer 1 and the second layer 2. To increase the M-O—Si bonds, the oxide film constituting the first layer 1 and/or the surface of the oxide film preferably contains at least one element selected from the group consisting of Si, Zr, Ti, Hf, V, Nb, Ta, Cr, Mo, and W. In addition, the amounts of carbonates and sulfates present in the surface of the substrate 3 are preferably reduced so as to prevent the M-O—Si bonds from reducing.

Production Method

Figure 2:
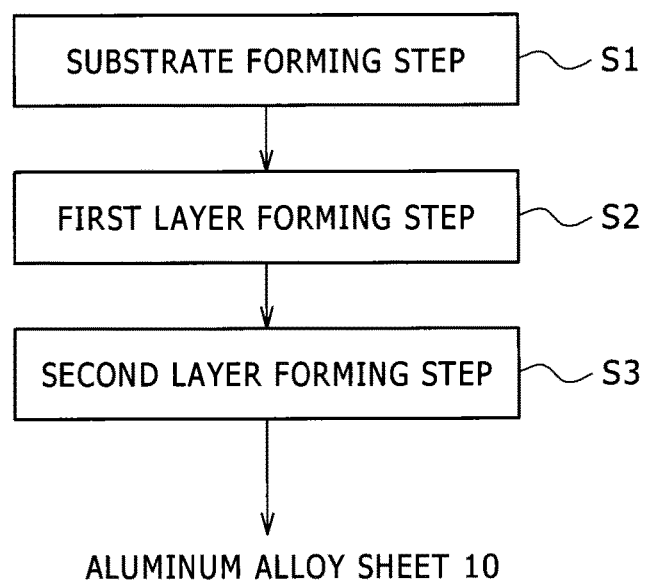
FIG. 2 is a flow chart illustrating a method for producing the aluminum alloy sheet illustrated in FIG. 1.

Next, a method for producing the aluminum alloy sheet according to the embodiment will be illustrated. FIG. 2 is a flow chart illustrating a method for producing the aluminum alloy sheet 10 according to the embodiment. As illustrated in FIG. 2, the aluminum alloy sheet 10 according to the embodiment may be produced by performing a substrate preparing step S1, a first layer forming step S2, and a second layer forming step S3. The steps will be illustrated below.

Step S1: Substrate to Preparing Step

The substrate 3 is prepared in the substrate preparing step S1 typically by the following procedure. Initially, an aluminum alloy having a predetermined chemical composition is melted and cast by continuous casting to give an ingot (melting-casting process). Next, the prepared ingot is soaked (soaking process). The soaked ingot is hot-rolled to give a hot-rolled sheet (hot rolling process). The hot-rolled sheet is then subjected to heat treatment or intermediate annealing at 300° C. to 580° C., subjected to at least one pass of cold rolling to a final cold rolling reduction of 5% or more, and yields a cold-rolled sheet (substrate 3) having a predetermined thickness (cold rolling process).

The heat treatment or intermediate annealing in the cold rolling process is preferably performed at a temperature of 300° C. or higher. This contributes to more effectively better formability. The heat treatment or intermediate annealing is preferably performed at a temperature of 580° C. or lower. The cold rolling is preferably performed to a final cold rolling reduction of 5% or more. This contributes to more effectively better formability. The soaking and hot rolling may be performed under any conditions not critical and can be performed under such general conditions as to give hot-rolled sheets. The intermediate annealing does not have to be performed necessarily.

Step S2: First Layer Forming Step

In the first layer forming step, the first layer 1 including an oxide film is formed on either one or both sides of the substrate 3 prepared in the substrate preparing step, i.e., Step S1. Specifically, the substrate 3 is subjected to a heat treatment to form an oxide film, and the formed oxide film is subjected to a surface treatment so as to have a Mg content and an amount of M-O—Si bonds within the specific ranges.

In the heat treatment, the substrate 3 is heated to a temperature of 400° C. to 580° C. to form an oxide film on the surface of the substrate 3, where the oxide film constitutes the first layer 1. The heat treatment also effectively adjusts the strength of the aluminum alloy sheet 10. As used herein the "heat treatment" refers to a solution heat treatment when the substrate 3 includes a heat-treated aluminum alloy; and refers to a heat treatment in annealing (final annealing) when the substrate 3 includes a non-heat-treated aluminum alloy.

The heat treatment is preferably performed as rapid heating at a heating rate of 100° C./min. or more. The rapid heating, when performed at a heating temperature of 400° C. or higher, may contribute to higher strength of the aluminum alloy sheet 10 and higher strength of the aluminum alloy sheet 10 after post-painting heating (baking). In contrast, the rapid heating, when performed at a heating temperature of 580° C. or lower, may restrain formability deterioration due to burning. In addition, the heat treatment is preferably performed for a holding time of 3 to 30 seconds so as to give higher strength. As in the above manner, the heating of the substrate 3 at a heating temperature of 400° C. to 580° C. forms an oxide film having a thickness typically of 1 to 30 nm in the surface of the substrate 3.

The oxide film formed by the method is subjected to a surface treatment so as to control the Mg content in the first layer 1 and the amount of siloxane bonds formed between the first layer 1 and the second layer 2 within the specific ranges. Specifically, the oxide film formed in the surface of the substrate 3 may be treated with an acid and/or an alkaline solution. The acid is exemplified by mixed acids such as a mixed acid of hydrofluoric acid and sulfuric acid, and a mixed acid of hydrofluoric acid and nitric acid; and acids each containing at least one of Si, Zr, Ti, Hf, V, Nb, Ta, Cr, Mo, and W as an ion or salt, where the acids may also be mixed acids each including two or more different acids. The alkaline solution is exemplified by alkaline solutions each containing at least one of sodium hydroxide, potassium hydroxide, silicates, and carbonates; and alkaline solutions each containing at least one of Si, Zr, Ti, Hf, V, Nb, Ta, Cr, Mo, and W as an ion or salt, where the alkaline solutions are also exemplified by alkaline mixture solutions each containing two or more different alkalis. Each of different acids and/or each of different alkaline solutions may be used alone or in combination.

The treatment, when employed, should be performed under conditions adjusted as appropriate. This is because etching, if performed excessively on a copper containing aluminum alloy, may cause copper segregation in the surface of the substrate 3 and may cause deterioration of adhesive resin in hot and humid environments which may cause degradation. In the method for producing the aluminum alloy sheet 10 according to the embodiment, the Mg content and the oxide film structure are controlled by the treatment with a solution, where the oxide film structure affects the amount of M-O—Si bonds in the first layer 1. In addition, the treatment should also be performed under conditions controlled as appropriate, because the aluminum alloy chemical composition and the heat treatment as a previous process also affect the Mg content and the oxide film structure, although indirectly.

In Step S1 (first layer forming step), the control of the Mg content in the first layer 1 and the control of the oxide film structure so as to adjust the amount of M-O—Si bonds within the specific range may be performed together by one treatment, but may be performed separately by two or more different treatments.

Step S3: Second Layer Forming Step

In Step S3 as the second layer forming step, the siloxane-bond-containing second layer 2 is formed. The second layer 2 may be formed using a silane coupling agent containing a reactive functional group. The reactive functional group is exemplified by amino group, epoxy group, methacrylic group, methacryloxy group, vinyl group, and mercapto group. The silane coupling agent for use herein to form the second layer 2 may have any functional group not limited to the above ones and can be selected as appropriate from silane coupling agents containing various functional groups.

The silane coupling agent may be applied in such an amount that the mass of coating after drying is from 0.1 mg/m$^2$ to less than 30 mg/m$^2$ per one side. The siloxane-bond-containing second layer 2, if present in a mass of coating of 30 mg/m$^2$ or more, may undergo cohesive failure by itself and may cause a lower cohesive failure rate after deterioration in hot and humid environments. The second layer 2 may be present in a mass of coating of preferably less than 23 mg/m$^2$, and more preferably less than 15 mg/m$^2$.

The second layer 2 preferably has a smaller thickness so as to more easily ensure high bond durability when the aluminum alloy sheet is controlled to have the specific amount of M-O—Si bonds. However, the second layer 2, if present in a mass of coating less than 0.1 mg/m$^2$, may be more readily affected by Cu segregated on the substrate 3 and may cause the aluminum alloy sheet to include an insufficient amount of M-O—Si bonds. This may cause an insufficient cohesive failure rate after deterioration in hot and humid environments.

The mass of coating of the second layer 2 can be easily controlled typically by diluting the silane coupling agent with a solvent to lower the solids concentration and the viscosity of the silane coupling agent, or by adjusting the wet mass of coating using a water with a suitable count. The solvent is exemplified by organic solvents; and water. The coating of the silane coupling agent may be performed by any method which is not limited and may be selected from existing methods. Specifically, the coating method applicable herein is exemplified by immersion coating; coating using a water such as roll water, bar water, gravure water, micro-gravure water, reverse gravure water, or dip water; and spray coating.

Other Steps

The method for producing the aluminum alloy sheet 10 according to the embodiment may include one or more other steps between, and/or before, and/or after, the individual steps within ranges not adversely affecting the steps. For example, the method may include a preliminary temper aging step of performing preliminary temper aging after the second layer forming step S3. The preliminary temper aging is preferably performed by heating the workpiece at a low temperature of 40° C. to 120° C. for 8 to 36 hours within 72 hours after the step S3. The preliminary temper aging, when performed under the conditions, can contribute to better formability and higher strength after baking. The method may further include, for example, any of a foreign substance removing step of removing a foreign substance on the surface of the aluminum alloy sheet 10; and a rejected piece removing step of removing rejected pieces formed in the individual steps.

The produced aluminum alloy sheet 10 may be coated on its surface with a press forming oil before the preparation of a bonded article or before the processing into an automotive component. The press forming oil for use herein is selected from those containing an ester component. The coating of the aluminum alloy sheet 10 with the press forming oil may be performed by a method under conditions, both of which are not limited and may be widely selected from general methods and conditions for press forming oil coating. For example, the coating may be performed by immersing the aluminum alloy sheet 10 in a press forming oil containing ethyl oleate as an ester component. The ester component usable herein is not limited to ethyl oleate, but is also exemplified by various ester components such as butyl stearate and sorbitan monostearate.

As described in detail above, the aluminum alloy sheet 10 according to the embodiment includes a specific amount of bonds between the first layer 1 including an oxide film and the siloxane-bond-containing second layer 2. This gives, upon bonding (adhesion) of the aluminum alloy sheet 10 with an adhesive, chemical bonding at the interface between the adhesive and the siloxane-bond-containing second layer 2 and also provides chemical bonding between the siloxane-bond-containing second layer 2 and the first layer 1 including an oxide film. This allows the aluminum alloy sheet to resist strength deterioration by hydration even upon exposure to hot and humid environments and allows the resulting article to less suffer from interfacial peeling and to resist strength deterioration over a long time.

The aluminum alloy sheet 10 according to the embodiment includes the oxide film (first layer 1) containing a specific amount of magnesium, can thereby less cause the dissolution out of the aluminum alloy substrate 3, can restrain accompanied alkalization of the surface of the substrate 3, and can protect the adhesive resin from deterioration. In addition, the aluminum alloy sheet 10 according to the embodiment includes the layer (second layer 2) containing siloxane bonds in a specific amount. The aluminum alloy sheet thereby less suffers from cohesive failure in the second layer 2 and resist bond strength reduction.

Assume that a conventional aluminum alloy sheet includes a substrate 3 formed from an alloy containing Mg in a relatively high content. In this case, Mg may be segregated in the surface of the substrate 3, and a weak boundary layer may often be formed at the bonding interface. In contrast, the aluminum alloy sheet 10 according to the embodiment has a Mg content in the first layer 1 as controlled within the specific range. The aluminum alloy sheet according to the embodiment thereby less suffers from interfacial peeling and less undergoes bond strength reduction even when the substrate 3 is formed typically from an Al—Mg alloy, Al—Cu—Mg alloy, alloy, or Al—Zn—Mg alloy.

Modification of First Embodiment

Figure 3:
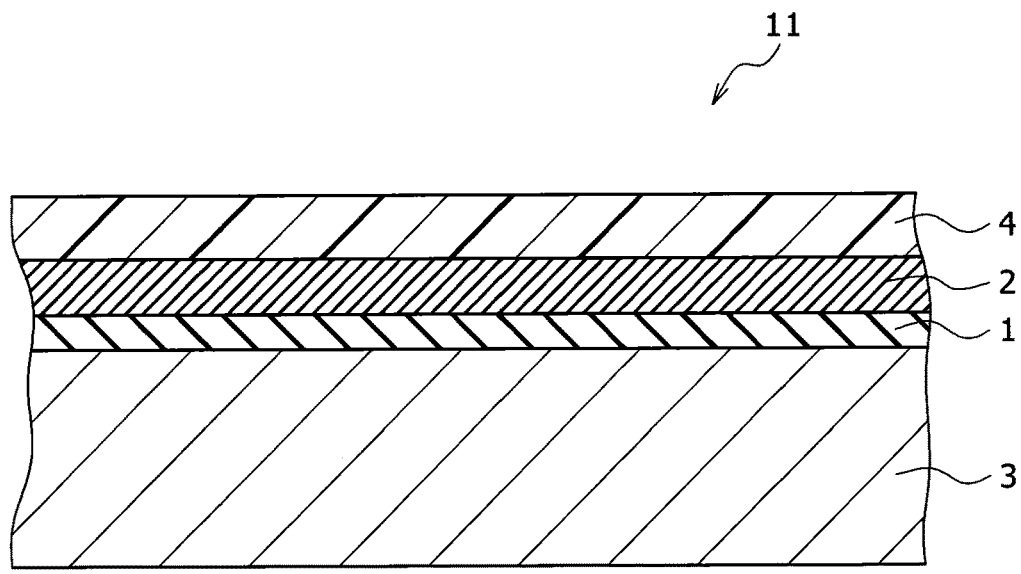
FIG. 3 is a cross-sectional view schematically illustrating a typical configuration of an aluminum alloy sheet according to a modification of the first embodiment of the present invention.

Next, an aluminum alloy sheet according to a modification of the first embodiment of the present invention will be illustrated. FIG. 3 is a cross-sectional view schematically illustrating the configuration of the aluminum alloy sheet according to this modification. In FIG. 3, constituents identical to those in the aluminum alloy sheet 10 (FIG. 1) are indicated with the same reference signs, and detailed descriptions of which are omitted. As illustrated in FIG. 3, the aluminum alloy sheet 11 according to the modification corresponds to the aluminum alloy sheet according to the first embodiment, except for further including an adhesive layer 4 disposed on or over the first layer 1 and the second layer 2, where the adhesive layer 4 includes an adhesive.

Adhesive Layer 4

The adhesive layer 4 includes an adhesive. Through the adhesive layer 4, the aluminum alloy sheet 11 according to the modification may be bonded to another aluminum alloy sheet. The adhesive constituting the adhesive layer 4 for use herein is not limited and may be selected from various adhesives such as reactive adhesives, solution adhesives, aqueous dispersion adhesives, and solid adhesives typified by hot-melt adhesives.

Specifically, the adhesive is exemplified by acrylic resin adhesives, α-olefinic adhesives, urethane resin adhesives, ethylene-vinyl acetate resin adhesives, epoxy resin adhesives, vinyl chloride resin adhesives, chloroprene rubber adhesives, vinyl acetate resin adhesives, cyanoacrylate adhesives, silicone adhesives, styrene-butadiene rubber adhesives, nitrile rubber adhesives, nitrocellulose adhesives, phenolic resin adhesives, polyamide resin adhesives, polyimide resin adhesives, polyolefin resin adhesives, poly(vinyl acetate) resin adhesives, polystyrene resin adhesives, poly (vinyl alcohol) adhesives, polyvinylpyrrolidone resin adhesives, poly(vinyl butyral) resin adhesives, polyaromatic adhesives, polymethacrylate resin adhesives, melamine resin adhesives, urea resin adhesives, and resorcinol adhesives. Each of these adhesives may be selected as appropriate according to the second layer 2 and the resin to be in contact with the adhesive layer 4, the aluminum alloy, and the production process.

For higher bond strength and/or better bond durability, the adhesive for use herein may be selected from a mixture of two or more different adhesives; an adhesive including a molecule added with a functional group; and an adhesive further containing a silane coupling agent as added. A resin, when to be in contact with the adhesive layer 4, may be used in the form of the resin or a precursor thereof as the adhesive.

The adhesive layer 4 may have a thickness not critical, but preferably 10 to 500 μm, and more preferably 50 to 400 μm. Assume that the adhesive layer 4 having a thickness less than 10 μm is used to bond the aluminum alloy sheet 11 through the adhesive layer 4 to another aluminum alloy sheet devoid of adhesive layers. In this case, the resulting bonded article may fail to have bond durability at high level. In contrast, if the adhesive layer 4 has a thickness greater than 500 μm, the bonded article may have lower bond strength.

Production Method

Figure 4:
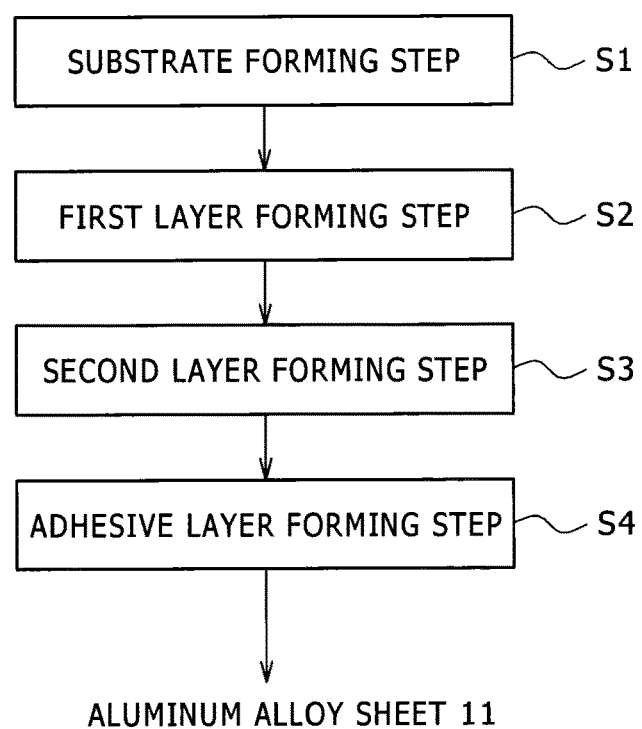
FIG. 4 is a flow chart illustrating a method for producing the aluminum alloy sheet illustrated in FIG. 3.

Next, a method for producing the aluminum alloy sheet 11 according to the modification will be illustrated. FIG. 4 is a flow chart illustrating the method for producing the aluminum alloy sheet 11 according to the modification. As illustrated in FIG. 4, the production of the aluminum alloy sheet 11 according to the modification includes an adhesive layer forming step S4 in addition to Steps S1 to S3.

Step S4: Adhesive Layer Forming Step

In the adhesive layer forming step S4, an adhesive layer 4 including an adhesive is formed so as to overlie the first layer 1 and the second layer 2. The adhesive layer 4 may be formed by any method not limited. For example, the adhesive layer 4, when employing a solid adhesive, may be formed by heating and thereby hot-melting the adhesive, laminating the adhesive, or spraying or applying a solution of the adhesive in a solvent to the surface of the first layer 1 and the second layer 2. In contrast, the adhesive layer 4, when employing a liquid adhesive, may be formed by spraying or applying the adhesive as intact to the surface of the first layer 1 and the second layer 2.

The production method of the aluminum alloy sheet 11 according to the modification may further include a preliminary temper aging step of performing preliminary temper aging after the first layer forming step S1, the second layer forming step S2, and/or the adhesive layer forming step S4, as in the first embodiment.

The aluminum alloy sheet according to the modification includes the adhesive layer in advance and, when used to prepare a bonded article or an automotive component, enables the omission of an operation such as application of an adhesive to the surface of the aluminum alloy sheet. Other configurations and advantageous effects in the aluminum alloy sheet according to the modification are as in the first embodiment.

Second Embodiment

Next, a bonded article according to the second embodiment of the present invention will be illustrated. The bonded article according to the embodiment employs the aluminum alloy sheet according to the first embodiment or the modification thereof. FIGS. 5 to 8 are cross-sectional views schematically illustrating typical configurations of the bonded article according to the embodiment. In FIGS. 5 to 8, constituents identical to those in the aluminum alloy sheets 10 and 11 illustrated respectively in FIGS. 1 and 3 are indicated with the same reference signs, and detailed description of which are omitted.

Configurations of Bonded Article

Figure 5:
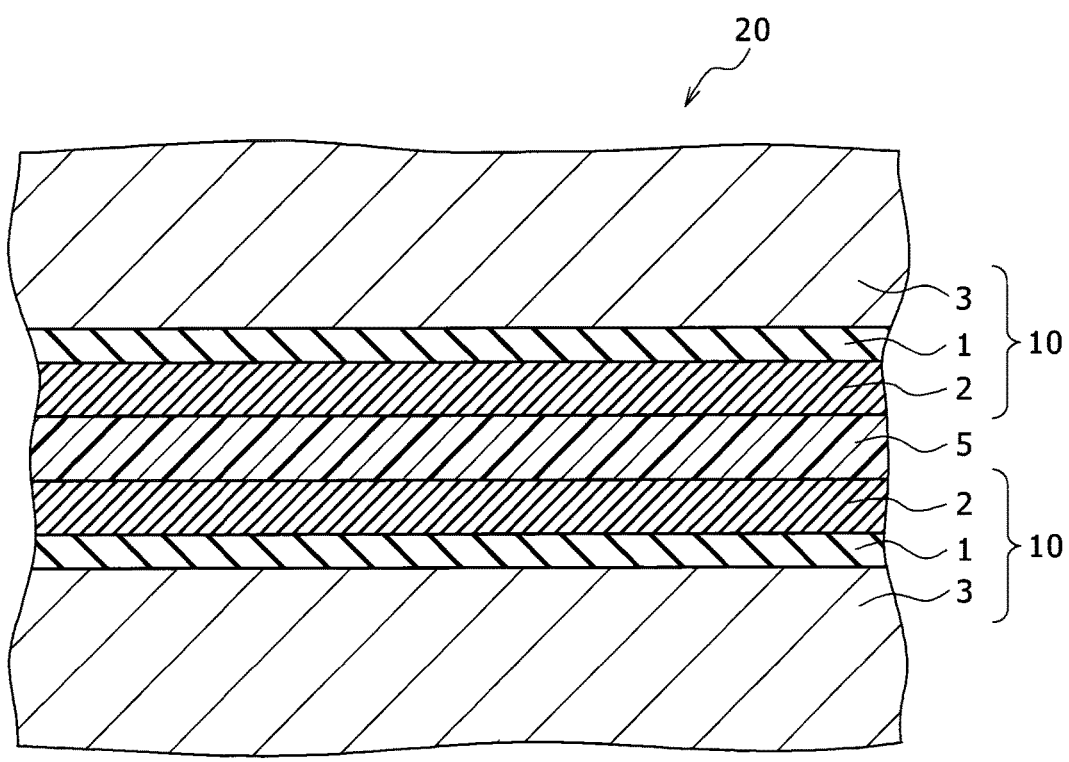
FIG. 5 is a cross-sectional view schematically illustrating a typical configuration of a bonded article according to a second embodiment of the present invention.
Figure 6:
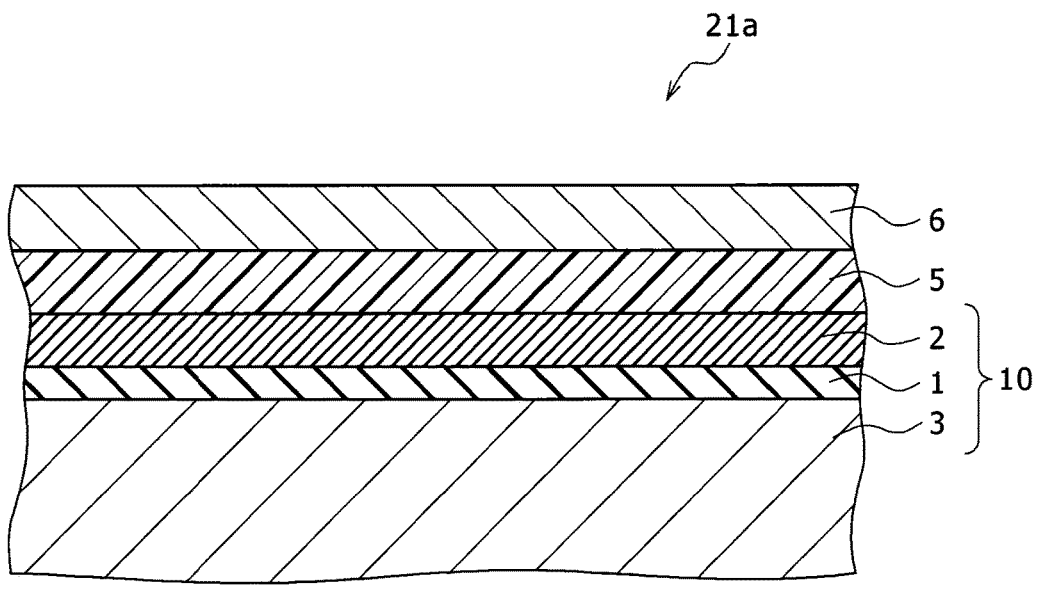
FIGS. 6A and 6B are cross-sectional views schematically illustrating other typical configurations of the bonded article according to the second embodiment of the present invention.
Figure 6:
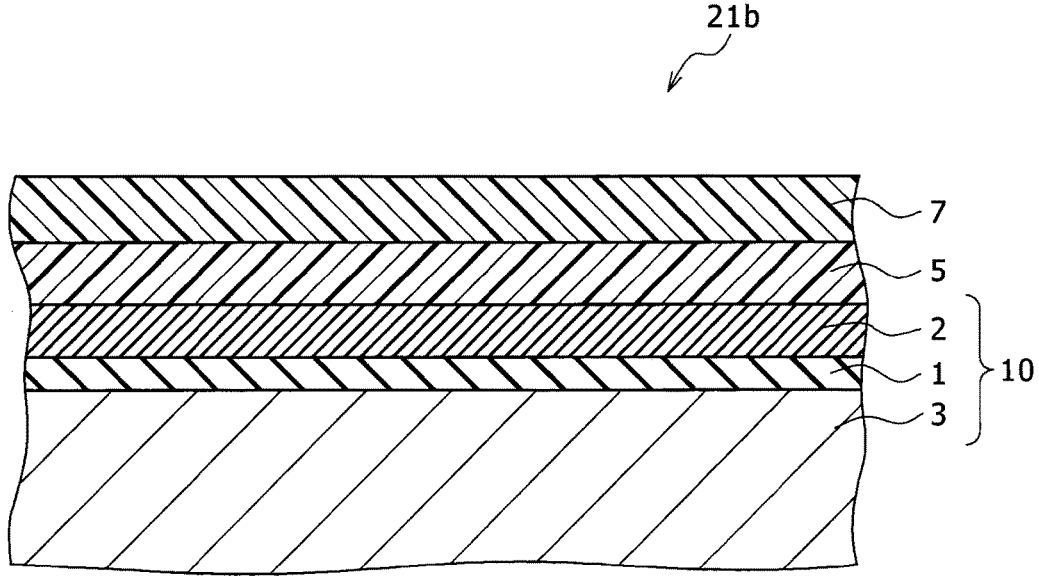

The bonded article according to the embodiment may have a configuration typically as with a bonded article 20 illustrated in FIG. 5. The bonded article 20 includes two plies of the aluminum alloy sheets 10 (FIG. 1) bonded to each other through an adhesive 5, where the two plies of the aluminum alloy sheets 10 are arranged so that the sides bearing the first layer 1 and the second layer 2 face each other. Specifically, in the bonded article 20, one side of the adhesive 5 is bonded to the second layer 2 side of one aluminum alloy sheet 10, and the other side is bonded to the second layer 2 side of the other aluminum alloy sheet 10.

The adhesive 5 in the bonded article according to the embodiment is not limited and may be selected from various adhesives such as reactive adhesive, solution adhesives, aqueous dispersion adhesives, and solid adhesives typified by hot-melt adhesives. Specifically, the adhesive 5 is exemplified by acrylic resin adhesives, α-olefinic adhesives, urethane resin adhesives, ethylene-vinyl acetate resin adhesives, epoxy resin adhesives, vinyl chloride resin adhesives, chloroprene rubber adhesives, vinyl acetate resin adhesives, cyanoacrylate adhesives, silicone adhesives, styrene-butadiene rubber adhesives, nitrile rubber adhesives, nitrocellulose adhesives, phenolic resin adhesives, polyamide resin adhesives, polyimide resin adhesives, polyolefin resin adhesives, poly(vinyl acetate) resin adhesives, polystyrene resin adhesives, poly(vinyl alcohol) adhesives, polyvinylpyrrolidone resin adhesives, poly(vinyl butyral) resin adhesives, polyaromatic adhesives, polymethacrylate resin adhesives, melamine resin adhesives, urea resin adhesives, and resorcinol adhesives. Each of these adhesives may be selected as appropriate according to the second layers 2 and the resin to be in contact with the adhesive 5, the aluminum alloy, and the production process.

For higher bond strength and better bond durability, the adhesive 5 may be selected from a mixture of two or more different adhesives; an adhesive whose molecules are imparted with a functional group; and an adhesive further including a silane coupling agent as added. The adhesive 5 may be used in the form of the resin or a precursor thereof as the adhesive. The adhesive 5 may have a thickness not critical, but preferably 10 to 500 µm, and more preferably 50 to 400 µm for higher bond strength.

The bonded article 20 as illustrated above includes the adhesive 5 both sides of which are in contact with, or face, the first layers 1 and the second layers 2 of the aluminum alloy sheets 10 according to the first embodiment. The bonded article 20, when used in an automotive component, thereby resists bond strength reduction at the interface of the adhesive 5 with the first layer 1 or with the second layer 2 and has better bond durability even upon exposure to hot and humid environments. In addition, the bonded article 20 according to the embodiment has better bond durability at the interface regardless of the type of the adhesive 5, even when using any of adhesives conventionally used for bonding aluminum alloy sheets.

The bonded article may also have such configurations as with a bonded article 21a and a bonded article 21b respectively illustrated in FIGS. 6A and 6B. The bonded articles 21a and 21b include the aluminum alloy sheet 10 (FIG. 1), an adhesive 5, and another aluminum alloy sheet 6 or a resin molded article 7, where the other aluminum alloy sheet 6 is devoid of the first layer and the second layer. The other aluminum alloy sheet 6 or the resin molded article 7 is bonded through the adhesive 5 to the side bearing the first layer 1 and the second layer 2 side of the aluminum alloy sheet 10. The other aluminum alloy sheet 6 devoid of the first layer and the second layer for use herein may be as with the substrate 3. Specifically, the other aluminum alloy sheet 6 may be one including any of various non-heat-treated or heat-treated aluminum alloys as prescribed in, or as approximal to, JIS.

The resin molded article 7 for use herein may be selected typically from fiber-reinforced plastic molded articles formed from various fiber-reinforced plastics such as glass fiber-reinforced plastics (GFRPs), carbon fiber-reinforced plastics (CFRPs), boron fiber-reinforced plastics (BFRPs), aramid fiber-reinforced plastic (AFRFs, KFRPs), polyethylene fiber-reinforced plastics. The bonded article, when employing the fiber-reinforced plastic molded article, can have a lighter weight while maintaining strengths at certain levels.

The resin molded article 7 may be selected from not only those including the fiber-reinforced plastics, but also those including engineering plastics without fiber reinforcement, such as polypropylenes (PPs), acrylic-butadiene-styrene copolymer (ABS) resins, polyurethanes (PUs), polyethylenes (PEs), poly(vinyl chloride)s (PVCs), nylon 6, nylon 6-6, polystyrenes (PSs), polyethylene terephthalate)s (PETs), polyamides (PAs), poly(phenylene sulfide)s (PPSs), poly(butylene terephthalate)s (PBTs), and polyphthalamides (PPAs).

In the bonded articles 21a and 21b (FIG. 6A and FIG. 6B), one side of the adhesive 5 is bonded to the first layer 1 or the second layer 2. The bonded articles 21a and 21b, when used in an automotive component, thereby have better bond durability at the interface regardless of the type of the adhesive even upon exposure to hot and humid environments, as with the bonded article 20. The bonded article 21b (FIG. 6B) includes the aluminum alloy sheet 10 and the resin molded article 7 bonded to each other and has a lighter weight as compared with a bonded article including two aluminum alloy sheets bonded to each other. The bonded article 21b thereby enables weight reduction of an automobile. The bonded articles 21a and 21b (FIG. 6A and FIG. 6B) have other configurations and advantageous effects than above as with the bonded article 20 (FIG. 5).

Figure 7:
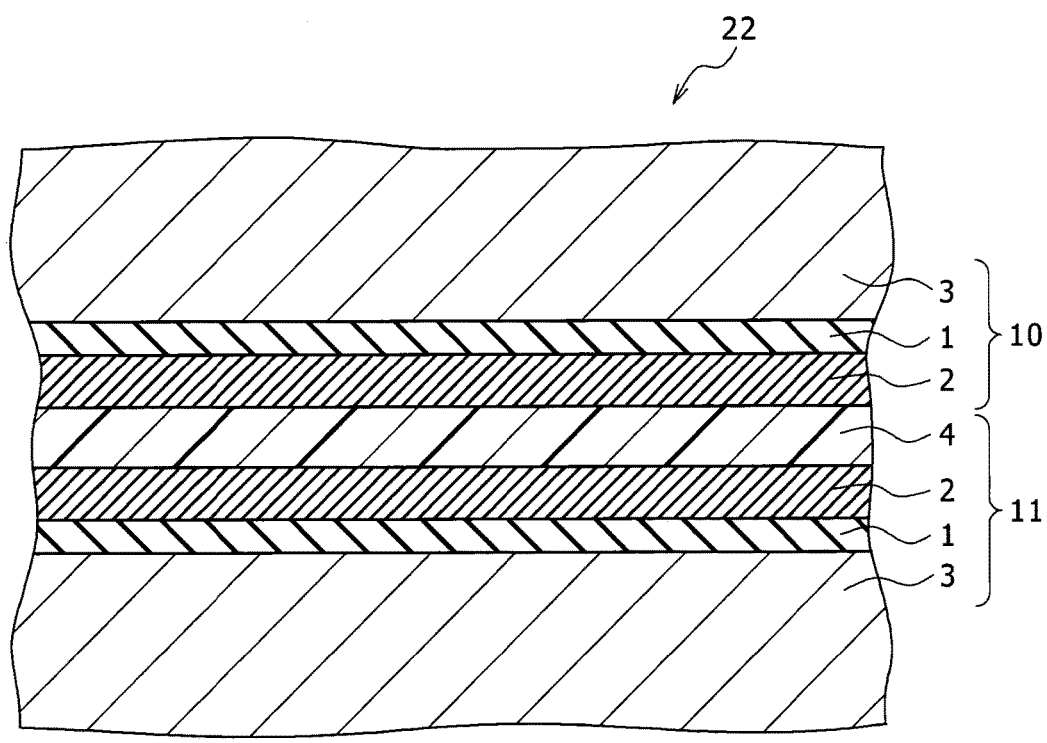
FIG. 7 is a cross-sectional view schematically illustrating another typical configuration of the bonded article according to the second embodiment of the present invention.
Figure 8:
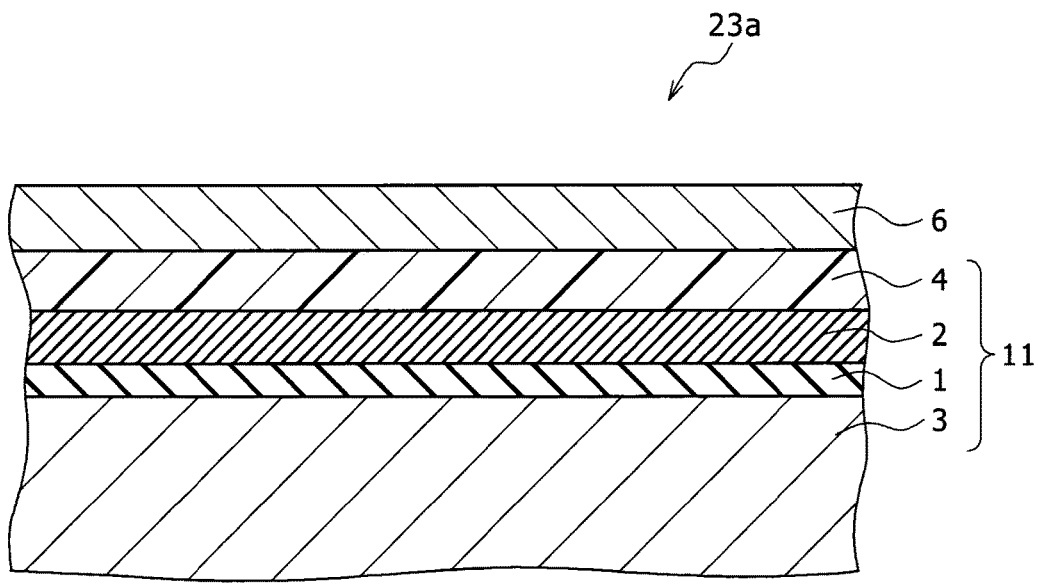
FIGS. 8A and 8B are cross-sectional views schematically illustrating other typical configurations of the bonded article according to the second embodiment of the present invention.
Figure 8:
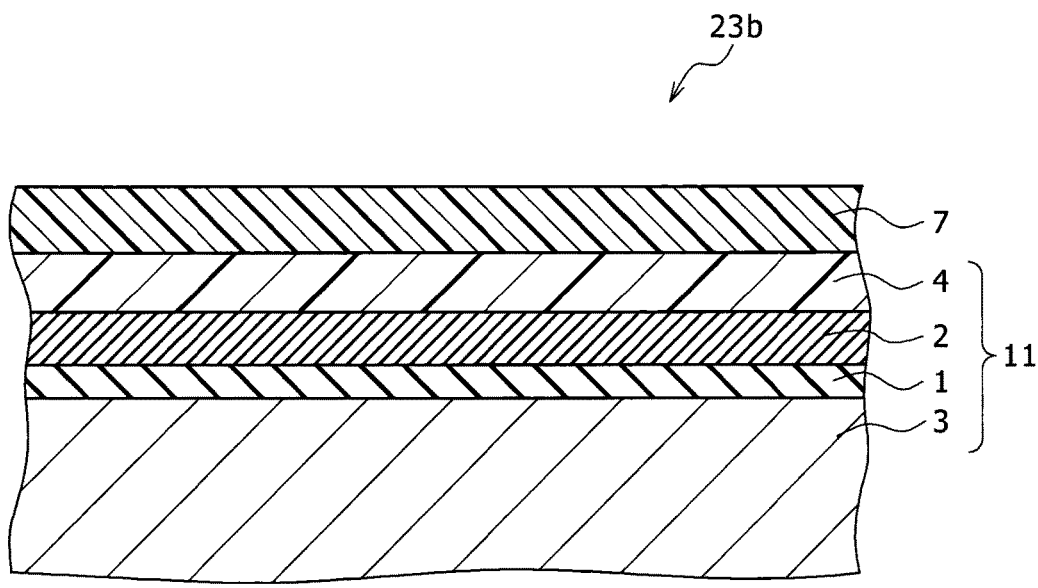

The bonded article may also have a configuration as with a bonded article 22 illustrated in FIG. 7. The bonded article 22 includes the aluminum alloy sheet 11 including the adhesive layer 4 (FIG. 3) and the aluminum alloy sheet 10 devoid of the adhesive layer 4 (FIG. 1) bonded to each other. Specifically, in the bonded article 22, the adhesive layer 4 of the aluminum alloy sheet 11 is bonded to the first layer 1 and the second layer 2 side of the aluminum alloy sheet 10. The resulting bonded article has a configuration in which the layers 1 or the layers 2 of the two aluminum alloy sheets 10 and 11 are disposed so as to face each other through the adhesive layer 4 of the aluminum alloy sheet 11.

In the bonded article 22, both sides of the adhesive layer 4 are bonded to the first layer 1 and the second layer 2 sides. The bonded article 22, when used in an automotive component and exposed to hot and humid environments, has better bond durability at the interface regardless of the type of the adhesive, as with the bonded article 20. The bonded article 22 (FIG. 7) has other configurations and advantageous effects than above as with the bonded article 20 (FIG. 5).

The bonded article may also have a configuration as with bonded articles 23a and 23b respectively illustrated in FIGS. 8A and 8B. The bonded articles 23a and 23b each include the aluminum alloy sheet 11 bearing the adhesive layer 4 (FIG. 3); and another aluminum alloy sheet 6 or a resin molded article 7 bonded to the adhesive layer 4, where the other aluminum alloy sheet is devoid of the first layer and the second layer. The resin molded article is exemplified by fiber-reinforced plastic molded articles. In the bonded articles 23a and 23b, one side of the adhesive layer 4 is bonded to the first layer 1 and the second layer 2 side. The bonded articles 23a and 23b, when used in an automotive component and even when exposed to hot and humid environments, have better bond durability at the interface regardless of the type of the adhesive, as with the bonded article 20.

The bonded article 23b (FIG. 8B) includes the aluminum alloy sheet 10 and the resin molded article 7 bonded to each other, thereby has a lighter weight as compared with a bonded articles including two aluminum alloy sheets bonded to each other, and is suitable for components of automobiles and vehicles which require weight reduction. The bonded articles 23a and 23b (FIGS. 8A and 8B) have other configurations and advantageous effects than above as with the bonded article 20 (FIG. 5).

Production Method

The bonded articles 20 to 23 may be produced, in particular bonded, by any of conventionally known bonding methods. The adhesive 5 may be applied to the aluminum alloy sheet by any method not limited. For example, the adhesive may be applied using an adhesive member previously formed from the adhesive 5. Alternatively, the adhesive 5 may be formed by spraying or applying the adhesive 5 to the surface of the siloxane-bond-containing second layer 2. Further alternatively, the adhesive 5, when being solid, may be applied by heating and hot-melting or by laminating. The bonded articles 20 to 23 may be coated on surface with a press forming oil before processing into automotive components, as with the aluminum alloy sheets 10 and 11.

In an embodiment, the bonded article according to the embodiment may employ an aluminum alloy sheet bearing the first layer 1 including an oxide film and the siloxane-bond-containing second layer 2 on both sides thereof (not shown). The bonded article according to this embodiment can further include any selected from the aluminum alloy sheets, another aluminum alloy sheet 6, and a resin molded article 7 bonded through the adhesive 5 or the adhesive layer 4 to each other, where the other aluminum alloy sheet 6 is devoid of the first layer 1 and the second layer 2.

The bonded article according to the embodiment includes the aluminum alloy sheet bearing the first layer on the aluminum alloy sheet, the second layer on the first layer, and the adhesive or adhesive layer. The first layer includes an oxide film containing Mg in a specific content. The second layer contains siloxane bonds and is present in a specific amount. The adhesive or adhesive layer is bonded to a side of the aluminum alloy sheet, where the side bears the first layer and the second layer. Assume that the bonded article according to the embodiment is used in an automotive component. In this case, the bonded article is less affected by the hydration of the first layer and less suffers from the dissolution out of the aluminum alloy substrate even upon exposure to hot and humid environments. This is because the adhesive resin and the second layer are chemically bonded to each other at the interface, and the second layer and the first layer are also chemically bonded at the interface.

The resulting bonded article can act as a bonded article that less undergoes interfacial peeling and resists bond strength reduction. The bonded article according to the embodiment includes the siloxane-bond-containing layer in an amount controlled within the specific range, thereby less suffers from cohesive failure in the layer, and resists bond strength reduction.

Third Embodiment

Next, an automotive component according to a third embodiment of the present invention will be illustrated. The automotive component according to the embodiment employs the bonded article according to the second embodiment and is exemplified by automobile panels.

The automotive component according to the embodiment may be produced typically, but not limitatively, by any of conventionally known production methods. For example, one of the bonded articles 20 to 23 (FIGS. 5 to 8) is subjected to processing such as cutting and/or press forming to give an automotive component having a predetermined shape.

The automotive component according to the embodiment is produced from the bonded article according to the second embodiment and, even upon exposure to hot and humid environments, is little affected by hydration of the adhesive or adhesive layer and the oxide film (first layer) and less suffers from the dissolution out of the aluminum alloy substrate. As a result, the automotive component according to the embodiment resists interfacial peeling and bond strength reduction upon exposure to hot and humid environments.

EXAMPLES

The present invention will be illustrated specifically on advantageous effects with reference to examples according to the present invention and comparative examples. In these examples and comparative examples, aluminum alloy sheets were prepared and examined on properties such as bond durability by methods under conditions mentioned below.

Examples 1 to 4 and Comparative Example 2

A 1-mm thick cold-rolled aluminum alloy sheet was prepared by the method using a JIS 6016 alloy belonging to 6xxx-series aluminum alloys. The JIS 6016 aluminum alloy used herein contains 0.54 percent by mass of Mg, 1.11 percent by mass of Si, and 0.14 percent by mass of Cu. The cold-rolled sheet was cut to give a substrate having a length of 100 mm and a width of 25 mm. Next, the substrate was alkaline-degreased, heat-treated to a substantial end-point temperature of 550° C., and cooled.

Successively, the substrate was subjected to a treatment with a nitric acid solution having a pH of 2 or less at a temperature of 10° C. to 80° C. for a treatment time of 1 to 60 seconds. The substrate was washed with water within 5 minutes after the treatment and dried within 5 minutes after the water washing to form an oxide film as a first layer. Next, an amino-containing silane coupling agent was diluted with pure water and applied to form a second layer, whose mass of coating after drying was controlled by employing different dilution rates and using bar coaters with different counts. Thus, aluminum alloy sheets according to Examples 1 to 4 and Comparative Example 2 were prepared. The drying after the silane coupling agent application was performed at 100° C. for one minute.

Examples 5 and 10

Aluminum alloy sheets according to Examples 5 and 10 were prepared by the procedure as in Examples 1 to 4, except for subjecting the substrate to a sodium hydroxide solution treatment before the nitric acid solution treatment. Specifically, the substrate was treated with a sodium hydroxide solution having a pH of 10 or more at a temperature in the range of 10° C. to 80° C. for a treatment time in the range of 1 to 60 seconds. These treatment conditions were controlled within the ranges so as to adjust the Mg content in the first layer, the amount (mass of coating) of the second layer, the amount of M-O—Si bonds, and the amount of Cu in the surface in the aluminum alloy sheets.

Example 6 and Comparative Example 3

Aluminum alloy sheets according to Example 6 and Comparative Example 3 were prepared by the procedure as in Examples 1 to 4, except for subjecting the substrate to surface treatments as follows. Specifically, the substrate was treated with a sodium hydroxide solution having a pH of 10 or more at a temperature of 10° C. to 80° C. for a treatment time of 1 to 60 seconds. The substrate was then treated with a hydrofluoric acid-sulfuric acid solution at a temperature of 10° C. to 80° C. for a treatment time of 1 to 60 seconds. The solution contained hydrofluoric acid and sulfuric acid in concentrations in the range of 0.01 to 6 mol/L so as to have a pH of 2 or less. The surface treatment conditions were controlled so as to adjust the Mg content in the first layer, the amount (mass of coating) of the second layer, the amount of M-O—Si bonds, and the amount of Cu in the surface in the aluminum alloy sheets.

Example 7

An aluminum alloy sheet according to Example 7 was prepared by the procedure as in Examples 1 to 4, except for subjecting the substrate to surface treatments as follows. Specifically, the substrate was subjected to a treatment with a hydrofluoric acid-sulfuric acid solution at a temperature of 10° C. to 80° C. for a treatment time of 1 to 60 seconds. The solution contained hydrofluoric acid and sulfuric acid in concentrations in the range of 0.01 to 6 mol/L so as to have a pH of 2 or less. The substrate was then subjected to a silicate treatment with a sodium silicate solution having a pH of 10 or more at a temperature of 10° C. to 80° C. for a treatment time of 1 to 60 seconds. In the resulting aluminum alloy sheet, the Mg content in the first layer, the amount (mass of coating) of the second layer, the amount of M-O—Si bonds, and the amount of Cu in the surface were thus adjusted.

Example 8

An aluminum alloy sheet according to Example 8 was prepared by the procedure as in Examples 1 to 4, except for subjecting the substrate to surface treatments as follows. Specifically, the substrate was treated with a nitric acid solution having a pH of 2 or less at a temperature of 10° C. to 80° C. for a treatment time of 1 to 60 seconds. The substrate was then subjected to a silicate treatment with a sodium silicate solution having a pH of 10 or more at a temperature of 10° C. to 80° C. for a treatment time of 1 to 60 seconds. In the resulting aluminum alloy sheet, the Mg content in the first layer, the amount (mass of coating) of the second layer, the amount of M-O—Si bonds, and the amount of Cu in the surface were thus adjusted.

Example 9

An aluminum alloy sheet according to Example 9 was prepared by the procedure as in Example 5, except for subjecting the substrate to a silicate treatment after the nitric acid solution treatment. The silicate treatment was performed with a sodium silicate solution having a pH of 10 or more at a temperature of 10° C. to 80° C. for a treatment time of 1 to 60 seconds. In the resulting aluminum alloy sheet, the Mg content in the first layer, the amount (mass of coating) of the second layer, the amount of M-O—Si bonds, and the amount of Cu in the surface were thus adjusted.

Comparative Example 1

An aluminum alloy sheet according to Comparative Example 1 by subjecting the substrate not to treatments with solutions as in the examples and the comparative example, but acetone washing alone.

Measurement of Amount of Siloxane-Bond-Containing Layer (Second Layer)

The amount (mass of coating) of the siloxane-bond-containing second layer was measured by X-ray fluorescence spectrometry. Specifically, silicon in the composite layer including the first layer and second layer was quantitatively determined by X-ray fluorescence spectrometry, and the intensity of the fluorescent X-ray was converted into a mass of coating using a calibration curve to determine the amount (mass of coating).

Measurement of Amount of M-O—Si Bonds

The amount of M-O—Si bonds was quantitatively determined by analysis with a Fourier-transform infrared spectrophotometer (FT-IR; Nicolet Magna-750 Spectrometer). Specifically, an FT-IR spectrum was measured using parallel polarized light at an incident angle of 75°. In the spectrum, a base line was drawn from 1026 $cm^{-1}$ to 1084 $cm^{-1}$, and the area of a peak occurring adjacent to 1057 $cm^{-1}$ and assigned to M-O—Si bonds was determined.

Measurement of Mg Content in Oxide Film (First Layer)

The Mg content in the first layer was determined in the following manner, where the first layer was a layer of a complex oxide of aluminum and magnesium. Specifically, elements excluding oxygen (O), nitrogen (N), and carbon (C) were measured in the thickness direction by glow discharge-optical emission spectroscopy (GD-OES) using Model JY-5000RF (supplied by HORIBA Jobin Yvon SAS). The elements to be measured are exemplified by metal elements such as aluminum (Al), magnesium (Mg), copper (Cu), iron (Fe), and titanium (Ti); and as silicon (Si). A maximum peak value of Mg in the first layer (oxide film) was defined as the Mg content.

Measurement of Cu Amount in Surface

Elements excluding oxygen (O), nitrogen (N), and carbon (C) were measured in the thickness direction by glow discharge-optical emission spectroscopy (GD-OES) using Model JY-5000RF (supplied by HORIBA Jobin Yvon SAS). The elements to be measured are exemplified by metal elements such as aluminum (Al), magnesium (Mg), copper (Cu), iron (Fe), and titanium (Ti); and silicon (Si). The amount of copper (Cu) in the outermost surface was calculated in percentage.

Cohesive Failure Rate (Bond Durability)

Figure 9:
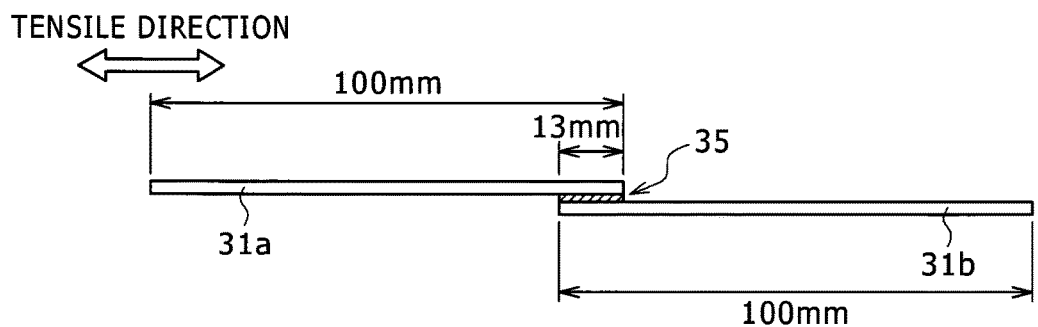
FIGS. 9A and 9B are a side view and a plan view schematically illustrating how to measure a cohesive failure rate.
Figure 9:
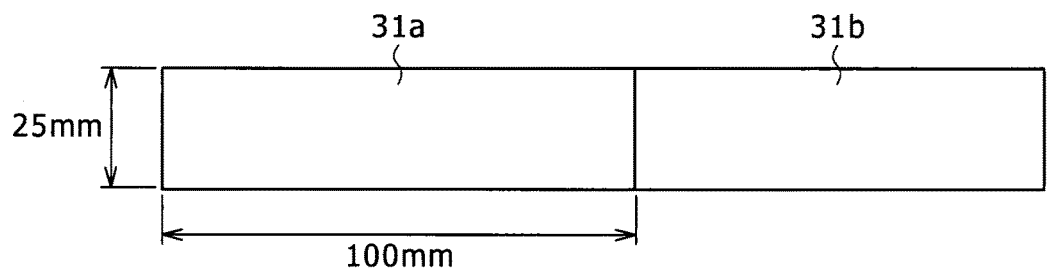

FIGS. 9A and 9B are a side view and a plan view, respectively, schematically illustrating how to measure a cohesive failure rate. As illustrated in FIGS. 9A and 9B, two test samples 31a and 31b (25 mm wide) having an identical configuration were overlapped and bonded through a thermosetting epoxy resin adhesive so as to have an overlap length of 13 mm with an bonded area of 25 mm by 13 mm. The adhesive 35 used herein is a thermosetting epoxy resin adhesive containing a bisphenol-A epoxy resin in a content of 40% to 50%.

The adhesive 35 had been combined with a trace amount of glass beads having a particle size of 150 μm so as to have a thickness of 150 μm. The resulting article was dried at room temperature for 30 minutes after the overlapping and then heated at 170° C. for 20 minutes so as to thermally cure the adhesive. The article was left stand at room temperature for 24 hours to yield a series of bonded test samples.

The prepared bonded test samples were subjected to a wet degradation test and a salt spray test, and the cohesive failure rate of the adhesive at the bonded portion was evaluated after the individual tests. The wet degradation test was performed by holding the bonded test sample in a hot and humid environment at a temperature of 50° C. and relative humidity of 95% for 30 days. The salt spray test was performed by spraying an aqueous sodium chloride solution having a concentration of 5 percent by mass to the bonded test sample. The spraying was performed using a salt spray tester at a temperature in the test chamber of 35° C. for 300 hours.

The bonded test samples after the tests were pulled at a tensile rate of 50 mm/min. using a tensile tester, and the cohesive failure rate was calculated from the interfacial peeling area and the bonded area of each test sample according to Mathematical Expression 1 below. In Mathematical Expression 1, "test specimen "a"" refers to one part of the bonded test sample after pulling, and "test specimen "b"" refers to the other part thereof.

Cohesive failure rate (%)=100−{[(Interfacial peeling area of test specimen "a")/(Bonded area of test specimen "a")×100]+[(Interfacial peeling area of test specimen "b")/(Bonded area of test specimen "b")×100]}  [Math. 1]

Each three bonded test samples were prepared and subjected to the tests. The cohesive failure rate was determined as an average of the three test samples. The bond durability was evaluated according to criteria as follows. A sample having a cohesive failure rate less than 70% was evaluated as having poor bond durability (x), a sample having a cohesive failure rate of from 70% to less than 80% was evaluated as having good bond durability (Δ), a sample having a cohesive failure rate of from 80% to less than 90% was evaluated as having satisfactory bond durability (○), and a sample having a cohesive failure rate of 90% or more was evaluated as having excellent bond durability (◉). Samples having a cohesive failure rate of 70% or more were accepted herein.

The results are all together indicated in Table 1 as follows.

As demonstrated in Table 1, the aluminum alloy sheets according to Examples 1 to 10 had properties or factors within ranges as specified in the present invention and had good cohesive failure rates (bond durability). In contrast, the aluminum alloy sheet according to Comparative Example 1 had a Mg content in the first layer (oxide film) greater than the range specified in the present invention, thereby had a low cohesive failure rate, and offered poor bond durability.

The aluminum alloy sheet according to Comparative Example 2 had a mass of coating of the siloxane-bond-containing second layer greater than the range specified in the present invention, underwent cohesive failure occurring mainly in this layer, thereby less underwent cohesive failure of the adhesive, and was evaluated as rejected. The aluminum alloy sheet according to Comparative Example 3 included a large amount of the sulfate remaining in the surface of the substrate, thereby failed to include M-O—Si bonds sufficiently, and failed to have a sufficient cohesive failure rate.

The results demonstrated that the present invention can achieve aluminum alloy sheets that resist bond strength reduction and have satisfactory bond durability even upon exposure to hot and humid environments.

While the present invention has been particularly described with reference to specific embodiments thereof, it is obvious to those skilled in the art that various changes and modifications may be made without departing from the spirit and scope of the present invention. The present application claims priority to Japanese Patent Application No. 2013-109114 filed on May 23, 2013 and Japanese Patent Application No. 2014-055318 filed on Mar. 18, 2014, the entire contents of which are incorporated herein by reference.

INDUSTRIAL APPLICABILITY

The aluminum alloy sheet according to the present invention can be bonded with an adhesive, resists bond strength reduction, and has satisfactory bond durability even in hot and humid environments. Thus, the aluminum alloy sheet is particularly useful in and applicable to automotive components such as panels.

1 first layer
2 second layer
3 substrate
4 adhesive layer
5, 35 adhesive
6, 10, 11 aluminum alloy sheet
7 resin molded article
20, 21a, 21b, 22, 23a, 23b bonded article
31a, 31b test sample

TABLE 1

|  | Mg content in first layer (atomic percent) | Mass of coating of second layer (mg/m$^2$) | Amount of M-O-Si bonds | Amount of Cu in surface (atomic percent) | Wet degradation test | | Salt spray test | |
| --- | --- | --- | --- | --- | --- | --- | --- | --- |
|  |  |  |  |  | Cohesive failure rate (%) | Evaluation | Cohesive failure rate (%) | Evaluation |
| Example 1 | 7.5 | 27 | 0.019 | 0.03 | 74 | Δ | 71 | Δ |
| Example 2 | 15 | 16 | 0.021 | 0.04 | 81 | ○ | 81 | ○ |
| Example 3 | 11 | 5.1 | 0.02 | 0.04 | 84 | ○ | 87 | ○ |
| Example 4 | 3.1 | 0.27 | 0.014 | 0.08 | 81 | ○ | 78 | Δ |
| Example 5 | 1.8 | 0.7 | 0.012 | 0.47 | 71 | Δ | 73 | Δ |
| Example 6 | 1.7 | 0.9 | 0.016 | 0.31 | 82 | ○ | 79 | Δ |
| Example 7 | 2.1 | 5.3 | 0.028 | 0.18 | 92 | ◉ | 95 | ◉ |
| Example 8 | 3.2 | 2.2 | 0.031 | 0.03 | 97 | ◉ | 95 | ◉ |
| Example 9 | 0.8 | 2.1 | 0.025 | 0.35 | 98 | ◉ | 96 | ◉ |
| Example 10 | 1.1 | 1.3 | 0.0158 | 0.15 | 89 | ○ | 87 | ○ |
| Comparative example 1 | 45 | 7.1 | 0.012 | 0.09 | 58 | x | 54 | x |
| Comparative example 2 | 7.6 | 46 | 0.022 | 0.07 | 45 | x | 47 | x |
| Comparative example 3 | 3 | 1.5 | 0.005 | 0.45 | 65 | x | 52 | x |

The invention claimed is:

1. An aluminum alloy sheet comprising:
   an aluminum alloy substrate;
   a first layer disposed on at least one side of the aluminum alloy substrate, the first layer comprising an oxide film comprising Mg in a content of from 0.1 atomic percent to less than 30 atomic percent; and
   a second layer disposed on at least part of the first layer, the second layer comprising a siloxane bond, the second layer being present in a mass of coating of from 0.1 mg/m$^2$ to less than 30 mg/m$^2$,
   wherein, when parallel polarized light is applied to the side bearing the first layer and the second layer at an incident angle of 75°, and when resulting data are analyzed by Fourier-transform infrared spectroscopy to give a spectrum, a peak in the spectrum occurring adjacent to 1057 cm$^{-1}$ has an area of 0.01 or more with respect to a base line drawn from 1026 cm$^{-1}$ to 1084 cm$^{-1}$.

2. The aluminum alloy sheet according to claim 1, wherein the aluminum alloy substrate has an amount of Cu exposed to a surface of less than 0.5 atomic percent.

3. The aluminum alloy sheet according to claim 1, wherein the aluminum alloy substrate comprises at least one selected from the group consisting of:
   Al—Mg alloys;
   Al—Cu—Mg alloys;
   Al—Mg—Si alloys; and
   Al—Zn—Mg alloys.

4. The aluminum alloy sheet according to claim 1, further comprising an adhesive layer on the second layer, the adhesive layer comprising an adhesive.

5. A bonded article comprising the aluminum alloy sheet according to claim 1.

6. The bonded article according to claim 5, further comprising another ply of the aluminum alloy sheet,
   wherein the two plies of the aluminum alloy sheets are bonded to each other through an adhesive so that the side bearing the first layer and the second layer of one of the two aluminum alloy sheets faces the side bearing the first layer and the second layer of the other.

7. The bonded article according to claim 5, further comprising a component selected from:
   another aluminum alloy sheet devoid of the first layer and the second layer; and
   a resin molded article,
   wherein the component is bonded through an adhesive to the side bearing the first layer and the second layer of the aluminum alloy sheet.

8. The bonded article according to claim 5,
   wherein the bonded article comprises:
   a first aluminum alloy sheet according to claim 1, which further comprises an adhesive layer on the second layer, the adhesive layer comprising an adhesive; and
   a second aluminum alloy sheet according to claim 1, and
   wherein the two aluminum alloy sheets are bonded to each other through the adhesive layer so that the side bearing the adhesive layer of the first aluminum alloy sheet faces the side bearing the first layer and the second layer of the second aluminum alloy sheet.

9. The bonded article according to claim 5,
   wherein the bonded article comprises:
   a first aluminum alloy sheet according to claim 1, which further comprises an adhesive layer on the second layer, the adhesive layer comprising an adhesive; and
   a component selected from:
      a second aluminum alloy sheet devoid of the first layer and the second layer; and
      a resin molded article, and
   wherein the component is bonded to the side bearing the adhesive layer of the first aluminum alloy sheet.

10. The bonded article according to claim 7, wherein the resin molded article comprises a fiber-reinforced plastic molded article.

11. An automotive component produced using the bonded article according to claim 5.

* * * * *